United States Patent
Hare

(10) Patent No.: US 9,522,643 B2
(45) Date of Patent: Dec. 20, 2016

(54) VEHICLE REAR BUMPER WITH UTILITY WELL

(71) Applicant: Addictive Desert Designs, LLC, Mesa, AZ (US)

(72) Inventor: Jared A. Hare, Mesa, AZ (US)

(73) Assignee: Addictive Desert Designs, LLC, Mesa, AZ (US)

( * ) Notice: Subject to any disclaimer, the term of this patent is extended or adjusted under 35 U.S.C. 154(b) by 0 days.

(21) Appl. No.: 14/925,511

(22) Filed: Oct. 28, 2015

(65) Prior Publication Data

US 2016/0114748 A1    Apr. 28, 2016

Related U.S. Application Data

(60) Provisional application No. 62/069,502, filed on Oct. 28, 2014.

(51) Int. Cl.
*B60R 19/00* (2006.01)
*B60R 19/02* (2006.01)

(52) U.S. Cl.
CPC .................. *B60R 19/023* (2013.01)

(58) Field of Classification Search
CPC .................................................. B60R 19/023
USPC .......................................................... 293/106
See application file for complete search history.

(56) References Cited

U.S. PATENT DOCUMENTS

| | | | | |
|---|---|---|---|---|
| 3,471,070 A | * | 10/1969 | Olson | B60R 9/065 |
| | | | | 224/402 |
| 3,614,136 A | * | 10/1971 | Dent | B60R 19/48 |
| | | | | 220/255 |
| 5,823,585 A | * | 10/1998 | Tanguay | B60R 19/48 |
| | | | | 293/106 |
| 2004/0108737 A1 | * | 6/2004 | Evans | B60D 1/52 |
| | | | | 293/117 |

* cited by examiner

*Primary Examiner* — Joseph D Pape
(74) *Attorney, Agent, or Firm* — Venjuris P.C.; Michael F. Campillo

(57) ABSTRACT

A vehicle rear bumper with a utility well or tool box that is incorporated into a portion of a segmented rear bumper having a rearward facing surface that extends angularly forward relative to the back of the vehicle to facilitate access to the utility well and use of the utility well opening perimeter as a stepping surface or edge.

14 Claims, 10 Drawing Sheets

VEHICLE REAR BUMPER WITH UTILITY WELL

BACKGROUND OF THE INVENTION

Field of the Invention

The present invention relates to a bumper for a vehicle having a tail-gate. Vehicles and in particular trucks often include a pick-up bed having a tail-gate. The tail-gate hingedly attaches along a long edge of the tail-gate to the pickup bed at the rear of the bed. The tail gate when swings in an arced path to open and provides access to the pickup bed floor and interior. Trucks also commonly have a rear bumper attached to the truck frame. The rear of the pickup bed is generally above and adjacent the rear bumper.

Utility boxes or wells for securing parts, tools or other equipment are also commonly available and associated with trucks. As one example, utility boxes are commonly secured in pickup beds at the front of the pickup bed adjacent the truck cab rear wall. Utility or storage boxes have also been incorporated into truck bumpers, as disclosed in either U.S. Pat. No. 4,138,152 or 4,570,986 as projecting upwards or inwards, respectively from a bumper top surface. Related concepts or designs are illustrated in U.S. Pat. Nos. 3,614,136, 3,501,170, 3,606,385, 3,682,360, and 3,588,160. A reoccurring problem with the prior art bumper designs however, remains that it is difficult if not impossible to access the utility well or storage box when or if a truck tail-gate is in the open and especially if the tail-gate is resting at the fully open position. Accordingly, there is a need for improvements in the field.

SUMMARY OF THE INVENTION

Aspects of the invention are incorporated in a vehicle rear bumper that offers improvements and features over existing bumpers. The vehicle rear bumper includes a utility well or tool box that is incorporated into a portion of a segmented rear bumper and having a rearward facing surface that extends angularly forward relative to the back of the vehicle to facilitate access to the utility well and use of the utility well opening perimeter as a stepping surface or edge.

Aspects of the invention can be incorporated into a rear bumper for a vehicle. For the purposes of context in describing the rear bumper, the vehicle may comprise a truck that will generally include at least one rear fender and a tail-gate, the tail-gate with a tail-gate side that pivots from a point adjacent to the at least one rear fender. Opening the tail-gate consists of unlatching or unlatching the tail-gate and swinging the tail-gate downward about the pivot point adjacent the rearward facing portion or surface of the left and right rear fenders.

As one example, the rear bumper may be for a vehicle that has at least one rear fender and a tail-gate, the tail-gate having a tail-gate side edge that pivots from a point adjacent to the at least one rear fender, and the rear bumper may comprise a middle portion, and two end or lateral portions. The middle portion may include an upward facing polygon shaped middle portion lower step surface centered in the middle portion, and a pair of upward facing polygon shaped middle portion higher step surfaces on each side of the upward facing polygon shaped middle portion lower step surface. The two end portions may each be coupled to the middle portion, with each end portion comprised of an end portion rearward facing surface and an upward facing lateral portion step surface that is joined to, and at the same level, as each of the upward facing polygon shaped middle portion higher step surfaces. And, a utility well with an opening perimeter edge may be positioned in at least one of the rearward facing surfaces. When installed on a vehicle, the opening perimeter edge will extend toward the rear fender and past the tail-gate side edge thus making it possible to use the utility well as a step despite that the tail-gate is in the open position and blocks other rear bumper step surfaces.

In certain embodiments the middle portion may also include both a rearward facing narrow rectangular middle section that transitions to the upward facing polygon shaped middle portion lower step surface and a pair of rearward-facing polygon-shaped middle portion surfaces on either side of the rearward facing narrow rectangular middle section, respectively. In further variations, the middle portion may also include a pair of rearward facing middle portions surfaces on lateral sides of the upward facing middle portion step surface, and the middle portion surfaces may have less than a 10 degree arc relative to each other and the tail-gate. Or alternatively, the end portions may include a substantially rearward facing rectangular shaped end portion surface extending to a far edge to approximately align with the rear fender and extend beyond the tail-gate edge, and the utility well may be positioned in the substantially rearward facing rectangular shaped end portion surface so that the opening perimeter edge extends beyond the tail-gate edge to again enable use of the utility well as a step despite that the tail-gate is in the open position and blocks obstructs other rear bumper step surfaces.

In still other embodiments, the vehicle has a truck bed back edge the truck bed has a truck bed back edge oriented substantially perpendicularly to the at least one rear fender and the end portion rearward facing surface extends angularly forward at an angle of between about 10 degrees and 30 degrees relative to the back edge of the truck bed and toward the at least one rear fender. In further variations vehicle has a truck bed bottom surface and the end portion rearward facing surface angles downward at an angle of between about 10 degrees and 45 degrees relative to a normal extending from the truck bed bottom surface.

In further variations, the utility well of the rear bumper may have an access panel hingedly attached along a portion of the opening perimeter edge that can be opened or closed to allow or restrict access to the utility well. And more particularly, the vehicle may have a truck bed bottom surface and the end portion rearward facing surface is substantially rectangular and angles downward at an angle of between about 10 degrees and 45 degrees relative to a normal extending from the truck bed bottom surface, and the utility well access panel is hingedly attached along a narrow segment of the end portion rearward facing surface that is closest to the middle portion.

In further variations, the utility well may include a utility well wall that extends in the forward direction relative to the vehicle and substantially parallel and adjacent to the vehicle rear fender. The end portion may also include an end portion downward facing surface that extends substantially parallel to the utility well wall.

Aspects of the invention may also be embodied in a rear bumper for a pickup truck that has a truck bed bottom surface, a rear fender, a tail-gate with a tail-gate side edge. The rear bumper may include a middle portion comprised of a pair of polygon shaped middle portion higher step surfaces on either lateral side of a upward facing polygon shaped middle portion lower step surface; a pair of lateral portions, each lateral portion including a lateral portion rearward facing surface and a lateral portion step surface that transitions laterally from one of the polygon shaped middle portion higher step surfaces, the bumper lateral portions further comprising a lateral portion rearward facing surface angled forward relative to the tail-gate at an angle of between about 10 degrees and 30 degrees; and a utility well having a utility well opening perimeter edge cut into at least one of the lateral portion rearward facing surfaces with an access panel hingedly attached along a portion of the utility well opening perimeter edge.

In alternate variations, the at least one lateral portion rearward facing surface may comprise a substantially rectangular shaped surface. Or further, the at least one lateral portion rearward facing surface may be angled forward at an angle of between about 10 degrees and 30 degrees relative to the back edge of the tail-gate. And further still, the lateral portion rearward facing surface may also be angled downward at an angle of between about 10 degrees and 45 degrees relative to a normal extending from the truck bed bottom surface.

Several objectives are fulfilled by the invention. Primarily, it an objective of the invention to create a bumper from a plurality of flat sheets of bumper material that are each bent to the illustrated shape and bonded together such as by welding. It is another objective of the invention to include a utility well in the bumper with an access panel attached to the opening perimeter of the utility well, as illustrated.

DESCRIPTION OF PREFERRED EMBODIMENTS

Figure 1:
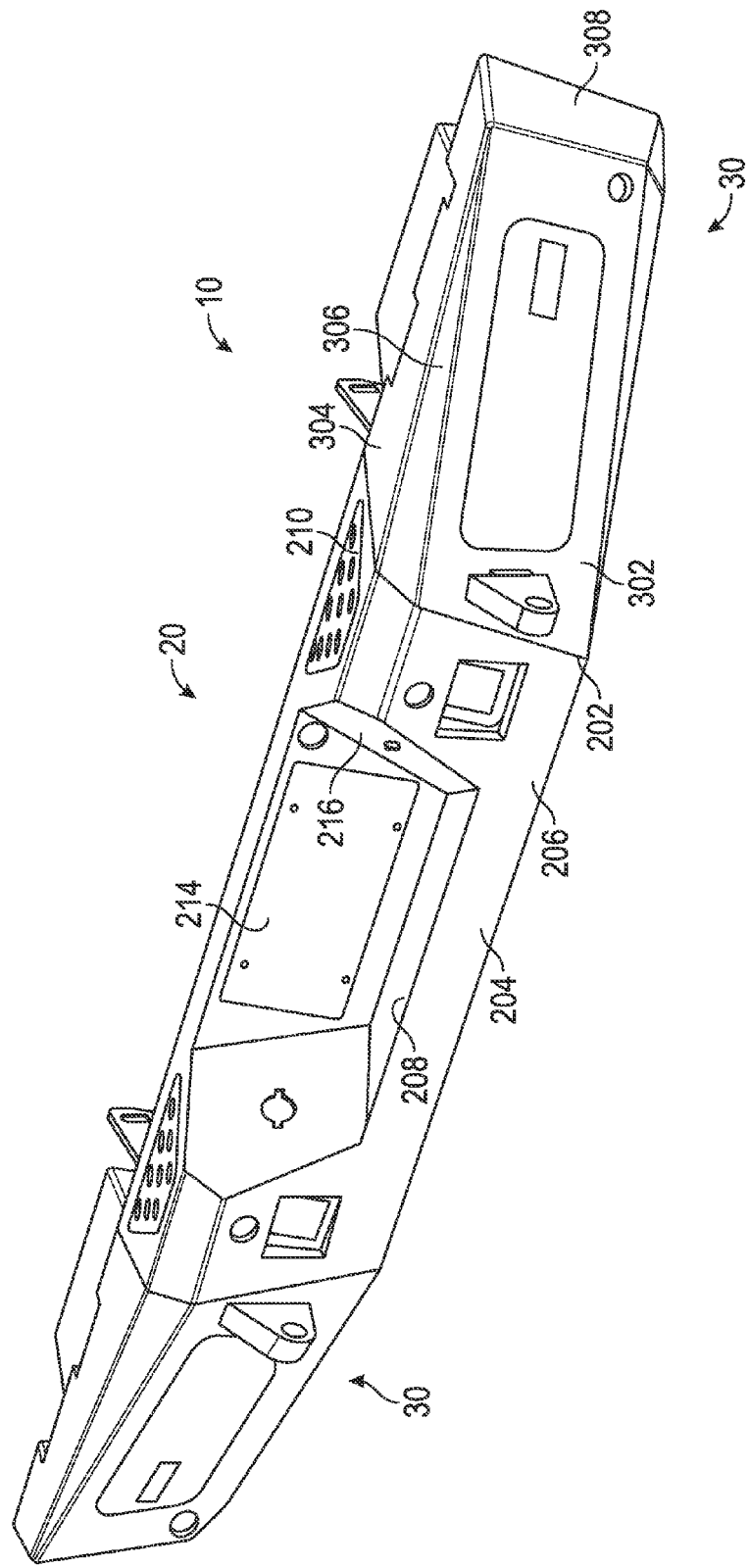
FIG. 1 illustrates a perspective view of an embodiment of a rear bumper 10 incorporating aspects disclosed herein including a middle portion 20 and two bumper end or lateral portions 30.
Figure 2:
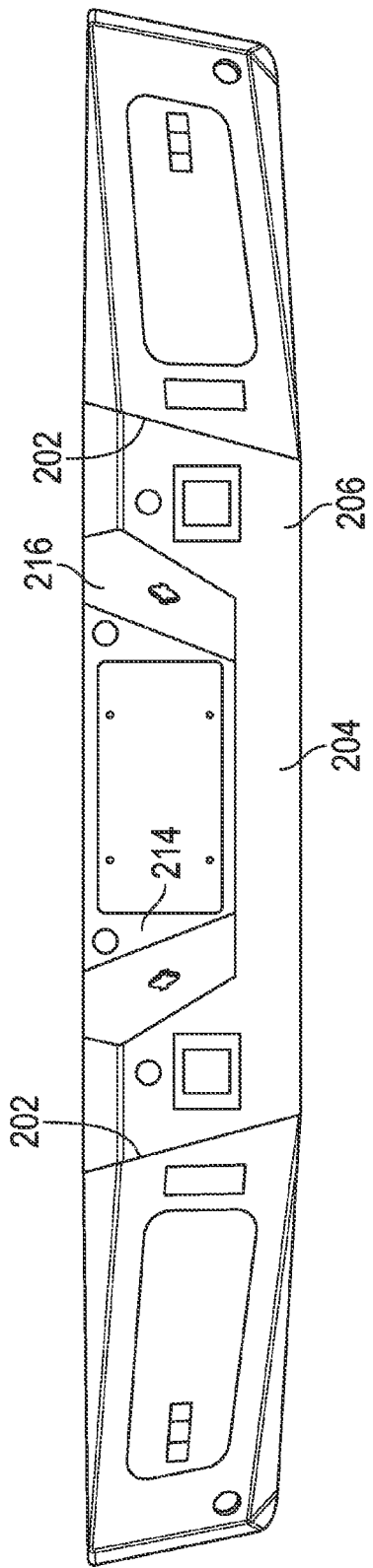
FIG. 2 illustrates a front view of the rear bumper 10, including the substantially rectangular rearward facing middle portion 204 between a pair of rearward-facing pentagon shaped middle portions 206 that transition to a pair of upward facing isosceles trapezoidal-shaped middle step surfaces 208 on either side of the substantially rectangular rearward facing middle portion 204, a rearward facing isosceles trapezoidal-shaped surface 214, a pair of middle portion upward angled rectangular shaped surfaces 216.

Aspects of the present invention are incorporated into an exemplary rear bumper 10 for vehicle 1 such as a pick-up truck as disclosed in the drawings. The rear bumper 10 generally includes at least one storage or utility well 60, which may function as a tool well, tool box, or general storage of any items capable of fitting in described utility well 60. The rear bumper 10 embodiment illustrated in the drawings is preferably comprised of an assembly of bumper portions that are individually fashioned from metal sheets having designed sizes and shapes that are attached together by welding the selected bumper portions along at least one edge of each bumper portion. The illustrated embodiment for example includes a middle portion 20, and two bumper end or lateral portions 30 of which at least one bumper end or lateral portions 30 includes a utility well 60.

The figures illustrate a rear bumper 10 according to the description and as installed on a vehicle 1 such as truck. The truck has at two rear fenders 2 and a tail-gate 4, the tail-gate 4 pivoting from a tail-gate side edge 6 at a point adjacent to the at least one rear fender 2, or as is usual, from points positioned on both tail-gate side edges 6 on the lower portions of the tail-gate 4. The vehicle 1 further includes a frame of which rear portion of the vehicle frame 3 extends to a point adjacent the truck bed back edge 8 and to which a rear bumper 10 as described, attaches.

The rear bumper 10 comprises a middle portion 20 having an substantially rectangular rearward facing middle portion 204 having a top edge that transitions to an upward facing polygon shaped middle portion lower step surface 208 that is centered in the middle portion 20 and side edges that transition to first and second or left and right rearward-facing polygon-shaped middle portions 206, respectively. The upward facing polygon shaped middle portion lower step surface 208 transitions or is fixed to an upward and outward angled surface 216 that provides a transition surface between the upward facing polygon shaped middle portion lower step surface 208 and a pair of polygon shaped middle portion higher step surface 210 on each side, and positioned substantially laterally to, the upward facing polygon shaped middle portion lower step surface 208.

Figure 3:
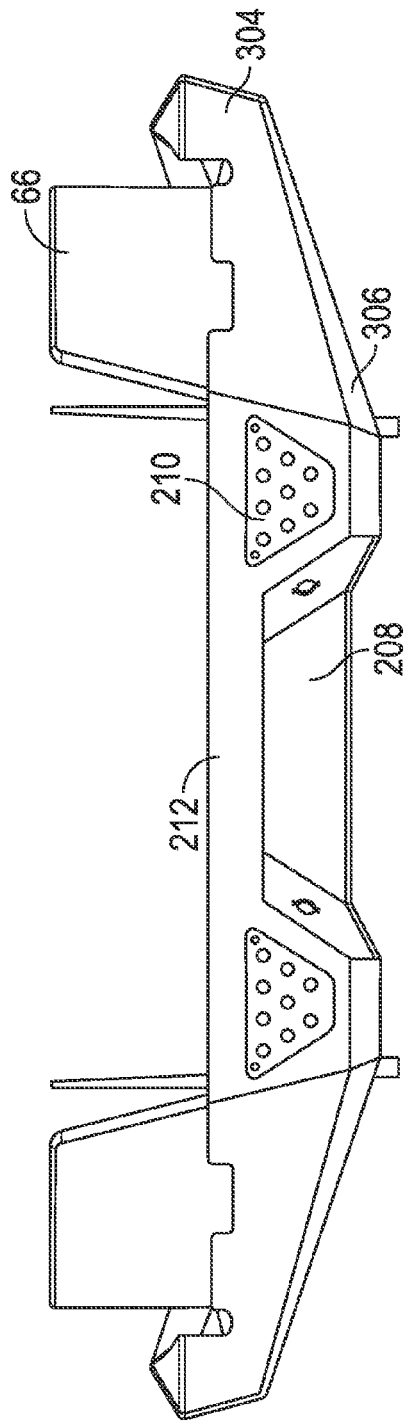
FIG. 3 illustrates top view of the rear bumper 10 emphasizing the upward-facing isosceles trapezoidal-shaped middle step surface sections 210 with cut-outs and non-slip inserts therein, and the upward facing isosceles trapezoidal-shaped middle step surface 208, and the projection of the utility well walls 66.
Figure 4:
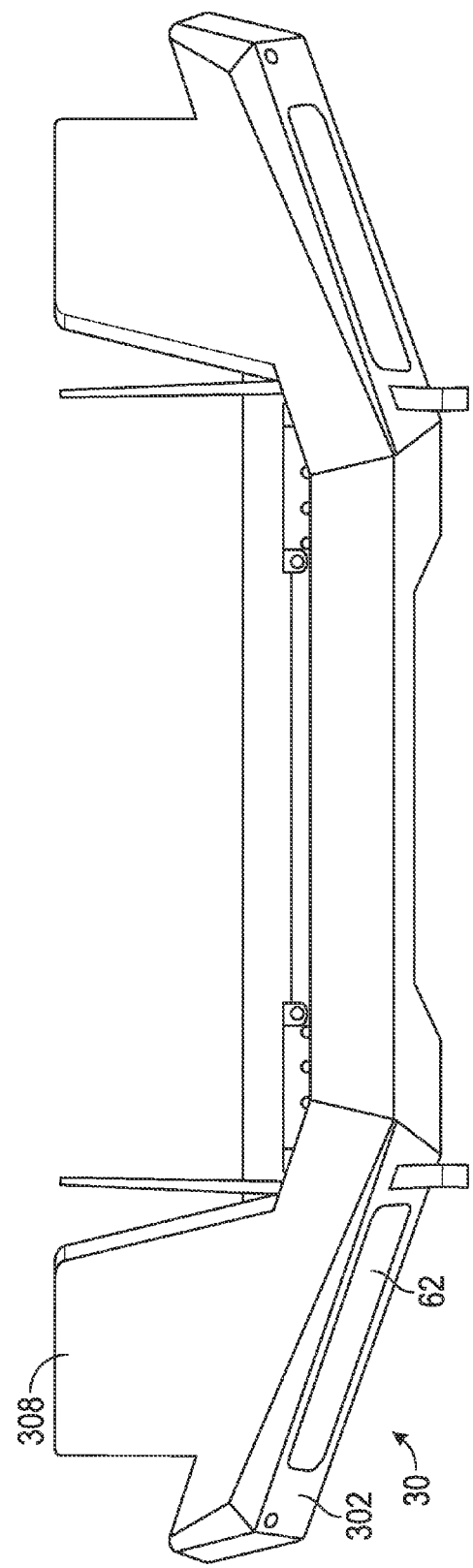
FIG. 4 illustrates a bottom view of the rear bumper 10 and shows the forward angled bumper lateral portions 30 including and the downward angle of the rearward facing substantially rectangular shaped surface 302.
Figure 5:
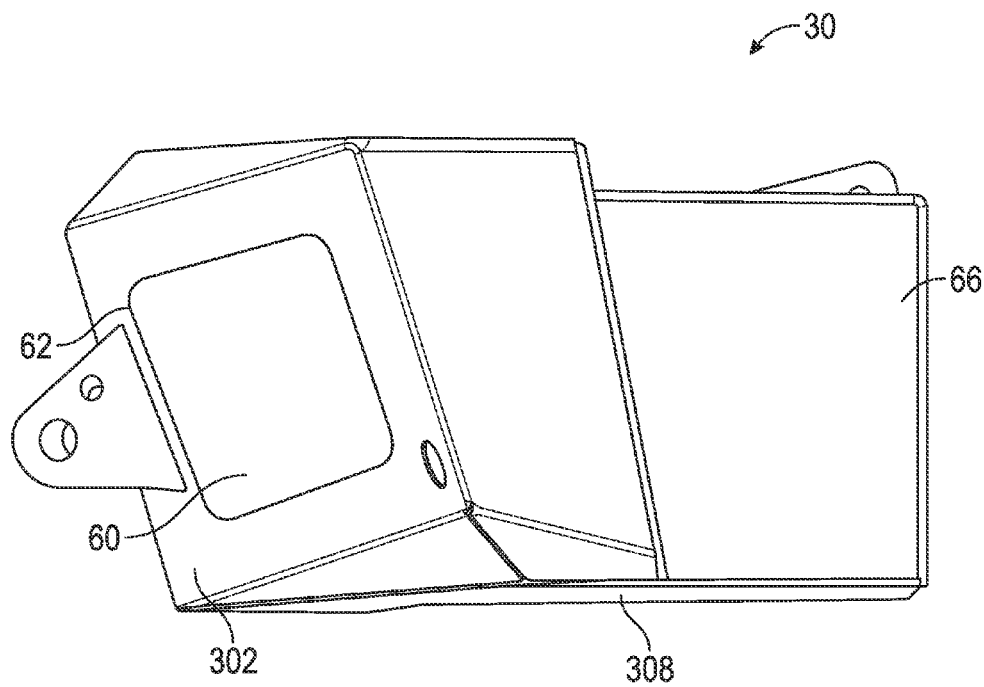
FIG. 5 illustrates a side view of the rear bumper 10 showing the end or bumper end or lateral portions 30 including a utility well 60 in a lateral portion rearward facing substantially rectangular shaped surface 302 of the bumper, a utility well wall 66 extend forward relative to the vehicle 1.

The preferred upward facing polygon shaped middle portion lower step surface 208 comprises a upward facing isosceles trapezoidal-shaped middle portion lower step surface 208 of which the back edge transitions to a rearward facing isosceles trapezoidal-shaped surface 214 that provides a substantially vertical attachment surface for a license plate or the like. Each lateral edge of the rearward facing isosceles trapezoidal-shaped surface 214 transitions to the upward and outward angled surface 216 that is preferably polygon shaped. The slight upward and laterally or outward angled surfaces 216 provide a guide or transitional surface for stepping onto the pair of polygon shaped middle portion higher step surfaces 210. As illustrated in FIG. 3, the upward facing polygon shaped middle portion lower step surface 208, the polygon shaped middle portion higher step surfaces 210 substantially aligned along the substantially rectangular rearward facing middle portion 204 and the truck bed back edge 8 to facilitate use of the respective surfaces as stepping surfaces to climb into or out of the truck bed. During use, an individual stepping on the upward facing polygon shaped middle portion lower step surface 208 may position his or her foot or feet at the outer most lateral portions of the upward facing polygon shaped middle portion lower step surface 208 until an upward and laterally or outward angled surfaces 216 is contacted, after which the individual can transition their feet up the upward and laterally angled rearward facing surfaces 216 until reaching either of the polygon shaped middle portion higher step surface 210. To facilitate use, and to deter slipping, the polygon shaped middle portion higher step surfaces 210 may have a similarly shaped interior cut-out into which a treaded or other non-slip surface is fixed to reduce the likelihood of slipping during use. A relatively narrow upward facing rectangular shaped strip 212 connects the polygon shaped middle portion higher step surfaces 210 and is oriented parallel to the truck bed back edge 8.

Bumper lateral or end portions 30 are fixed along and to the middle portion lateral edge 202 of the rearward-facing polygon-shaped middle portions 206 and the polygon shaped middle portion higher step surface 210. The lateral or end portions 30 are each comprised of bumper metal that is fashioned to have a rearward facing substantially rectangular shaped surface 302 that extends to a lateral far edge to extend just slightly beyond the tail-gate side edge 6 and approximately align with the rear fender 2. The lateral portion rearward facing substantially rectangular shaped surfaces 302 each have a top edge that transitions to a flat relatively narrow triangular section 306 that has its hypotenuse along the top edge of the rearward facing substantially rectangular shaped surface 302, its short leg along and fixed to the middle portion upward angled rectangular shaped surface 216, and its long leg transitioning to a lateral portion substantially polygon shaped, an preferably trapezoid-shaped, step surface 304. The lateral portion rearward facing surfaces 302 transition to a sideways facing substantially trapezoid-shaped surface 308 that approximately aligns substantially with the rear fender 2. In preferred rear bumper 10 embodiments, the end or lateral portion rearward facing surfaces 302 are also forward angled at an angle of between about 10 degrees and 30 degrees relative to the back edge of the truck bed back edge 8. Moreover, the end or lateral portion rearward facing surfaces 302 may also be angled downward at an angle of between about 10 degrees and 45 degrees, relative to a normal extending from the truck bed bottom surface 9 or alternatively, relative to a normal extending from the lateral portion step surface 304.

Figure 6:
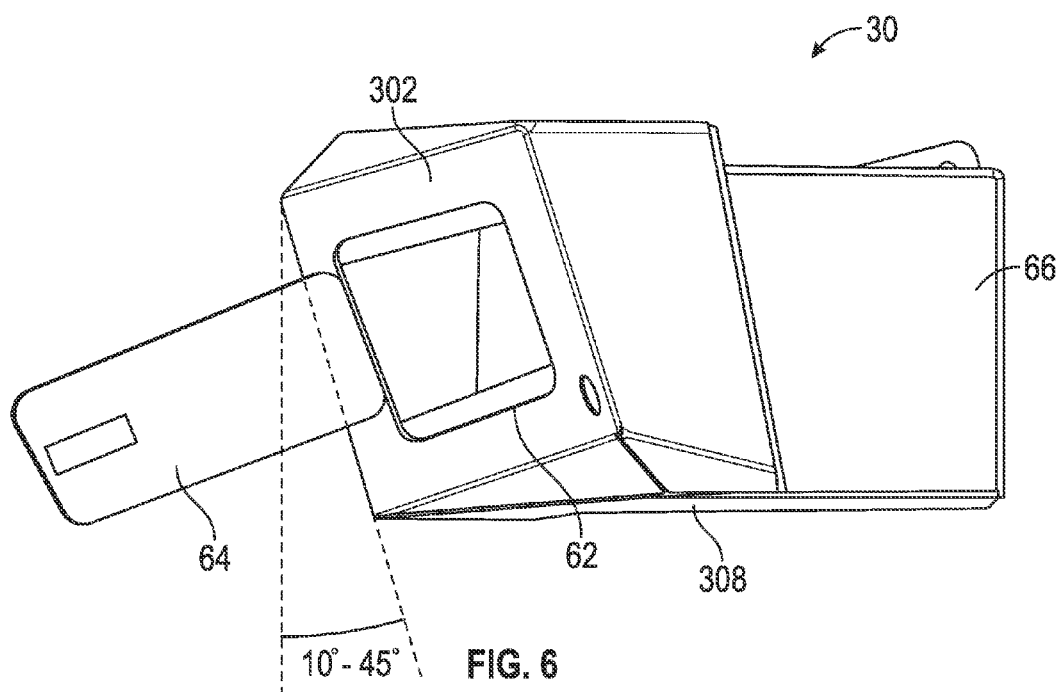
FIG. 6 illustrates another side view of the bumper end or lateral portion 30 with the utility well access panel 64 open and hingedly attached to a portion of the utility wall opening perimeter edge 62.
Figure 7:
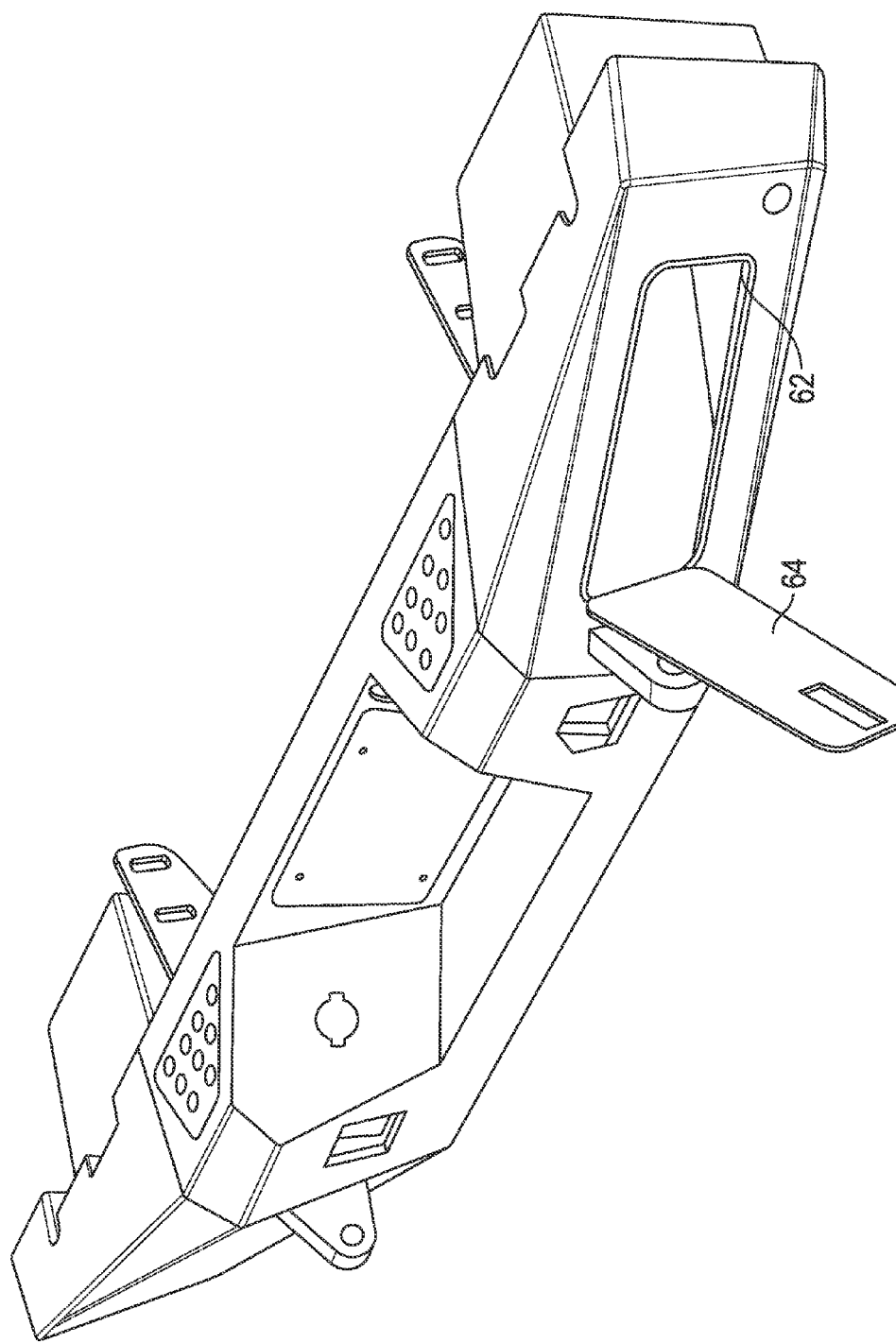
FIG. 7 illustrates a perspective view of the rear bumper 10 with the utility well access panel 64 hingedly attached to the utility well opening perimeter edge 62.
Figure 8:
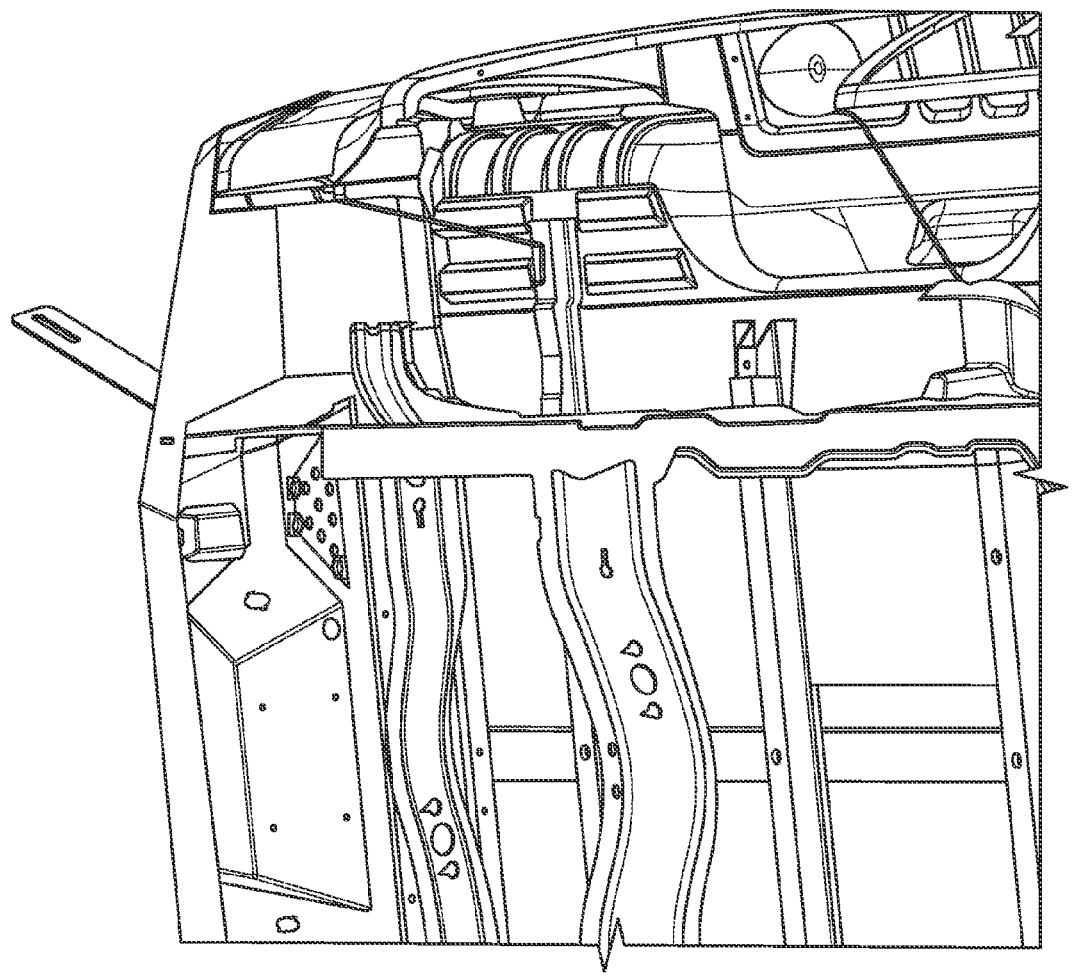
FIG. 8 illustrates a perspective view of the rear portion of the undercarriage of a vehicle having the rear bumper 10 attached thereto.
Figure 9:
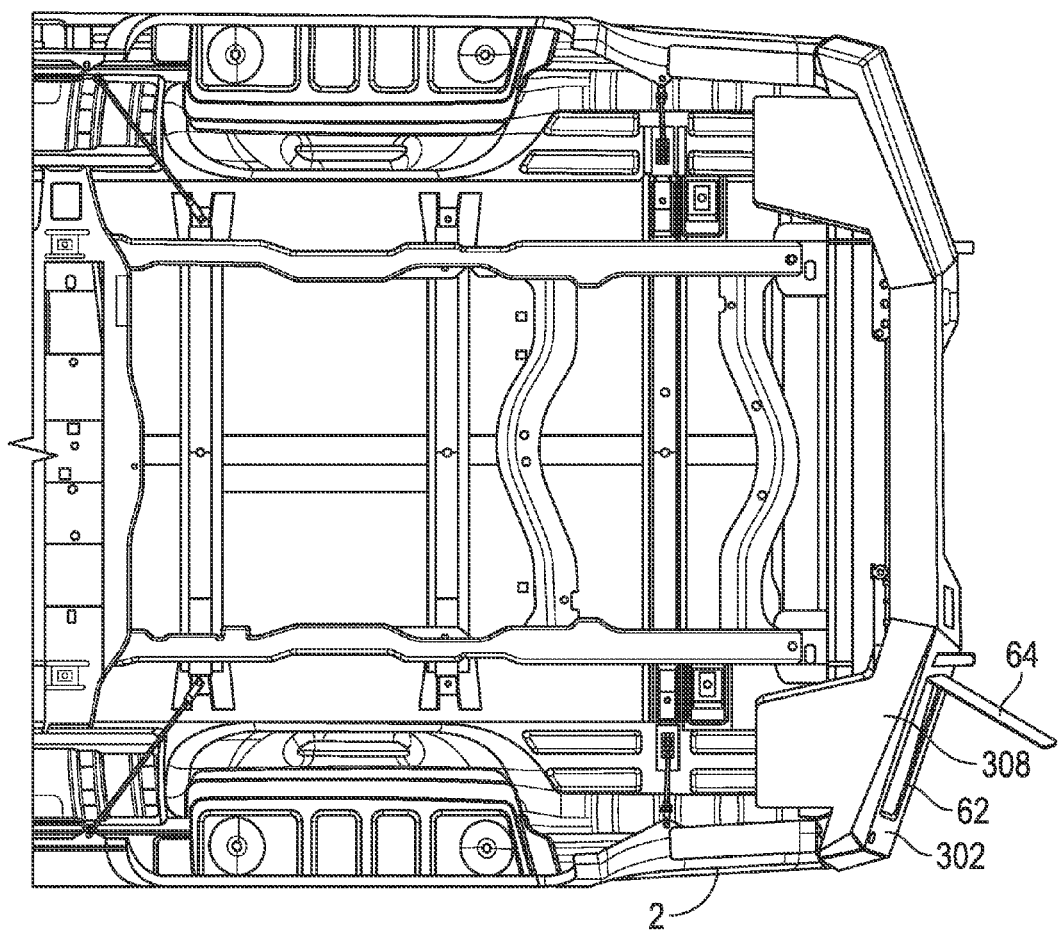
FIGS. 9-10 illustrate a bottom view of the rear portion of the undercarriage of the vehicle having the rear bumper 10 attached thereto and showing the relative positioning of the utility well 60 relative to the rear fender 2 and tail-gate 4.
Figure 10:
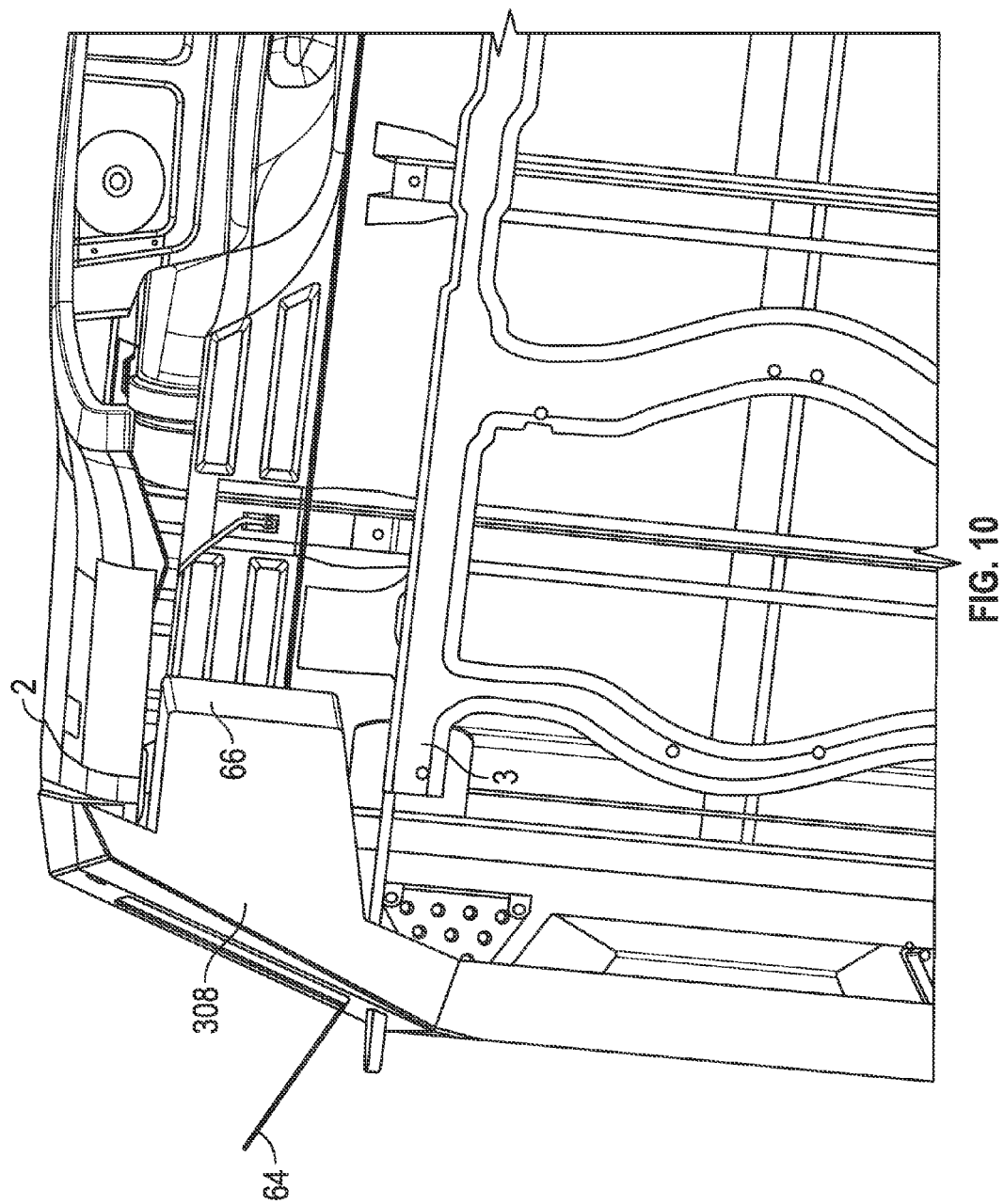
Figure 11:
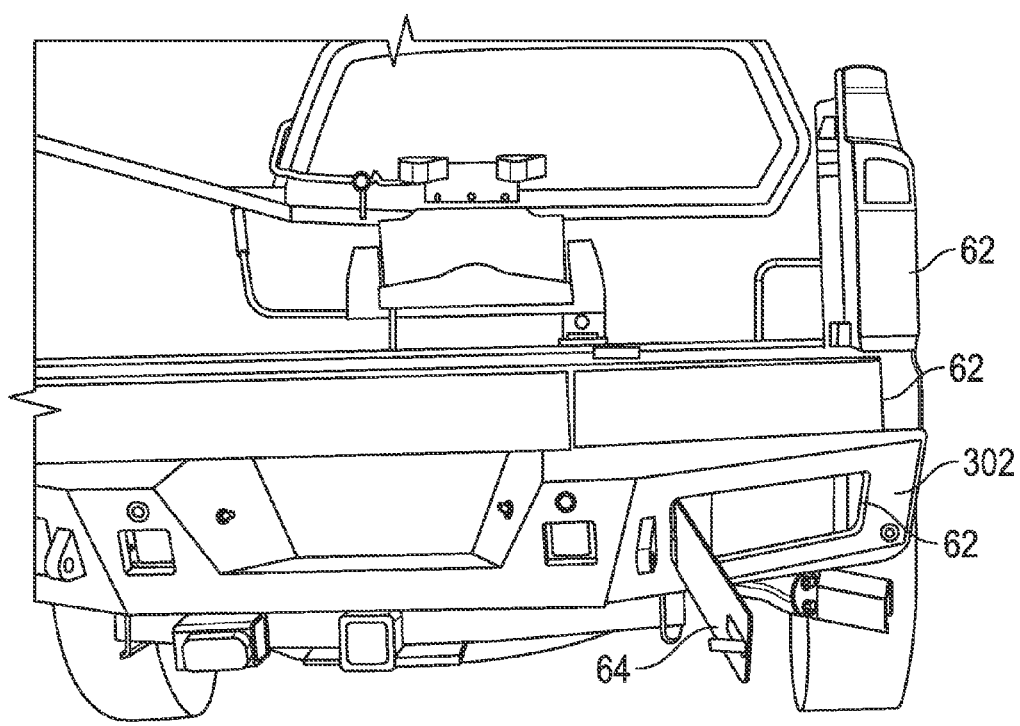
FIGS. 11-12 illustrate a rear perspective view of a vehicle including the rear bumper 10 and the utility well 60 positioned in at least one lateral portion rearward facing substantially rectangular shaped surface 302, the relative positioning of the utility well opening perimeter edge 62 extending toward the rear fender 2 past the tail-gate pivot point adjacent to the rear fender 2.
Figure 12:
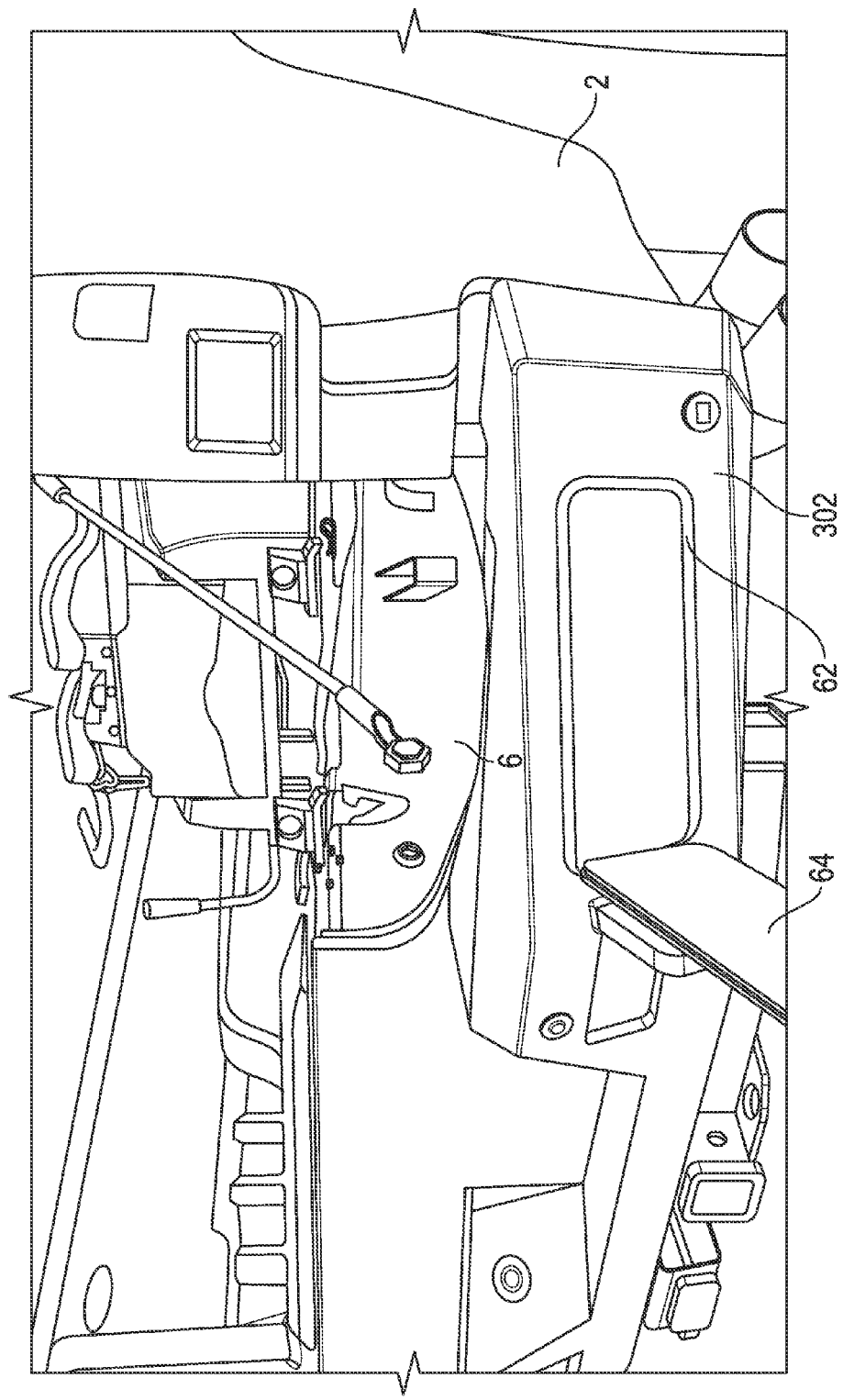

A utility well 60 for use as a storage container or a step having an opening perimeter edge 62 is located in at least one but may also be in each of the lateral portion rearward facing surfaces 302 and the opening perimeter edge 62 may extend toward the rear fender 2 and past the tail-gate side edge 6. A preferred opening perimeter edge 62 is substantially rectangular and with rounded corners and has substantially the same shape as the lateral portion rearward facing surface 302. A utility well access panel 64 may be attached such as by hinges, along a portion of the opening perimeter edge 62 and can be opened or closed to allow or restrict access to the utility well 60. Further, it is preferred that the utility well access panel 64 be hingedly attached along a narrow segment of the substantially rectangular opening perimeter edge 62 that is closest to the middle portion lateral edge 202 with the same preferred downward angle as the lateral portion rearward facing substantially rectangular shaped surface 302. See FIGS. 6 & 11. The preferred downward angle of the lateral portion rearward facing substantially rectangular shaped surface 302 helps in keeping the utility well access panel 64 biased in an open position due to the weight of the utility well access panel 64 that will allow the utility well access panel 64 to fall open. This can be particularly beneficial and prevent falls or injury if the utility well 60 is being used as a step into the truck bed and the tail-gate 4 or other object obscures the view of the individual from seeing that the utility well access panel 64 has closed making use of the utility well 60 as a step impossible. A utility well wall 66 extends in the forward direction relative to the vehicle and substantially parallel and adjacent and between a lateral portion downward facing surface 310, the vehicle rear fender 2, and the rear portion of the vehicle frame 3. See FIG. 10. Use of the utility well 60 includes both for storage and as a step to gain access to an elevated position such as a truck bed. Thus, in alternate but non-preferred embodiments, the utility well 60 does not include a utility well access panel 64 and the opening perimeter edge 62 transitions in a lateral direction to a utility well step surface.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A rear bumper for a vehicle, the vehicle having at least one rear fender and a tail-gate, the tail-gate having a tail-gate side edge that pivots from a point adjacent to the at least one rear fender, the rear bumper comprising:
   a middle portion, including an upward facing polygon shaped middle portion lower step surface centered in the middle portion and a pair of upward facing polygon shaped middle portion higher step surfaces on each side of the upward facing polygon shaped middle portion lower step surface;
   two end portions each coupled to the middle portion, each end portion comprised of an end portion rearward facing surface and an upward facing lateral portion step surface that is joined to, and at the same level, as each of the upward facing polygon shaped middle portion higher step surfaces; and
   a utility well positioned in at least one of the rearward facing surfaces and having an opening perimeter edge;
   wherein, when the rear bumper is attached to the vehicle, the opening perimeter edge extends toward the rear fender and past the tail-gate side edge.

2. The rear bumper in claim 1 wherein,
   the middle portion further includes both a rearward facing narrow rectangular middle section that transitions to the upward facing polygon shaped middle portion lower step surface, and a pair of rearward-facing polygon-shaped middle portion surfaces on either side of the rearward facing narrow rectangular middle section, respectively.

3. The rear bumper in claim 2 wherein,
the middle portion also includes a pair of rearward facing middle portions surfaces on lateral sides of the upward facing middle portion step surface, and the middle portion surfaces have less than a 10 degree arc relative to each other and the tail-gate.

4. The rear bumper for a vehicle in claim 2 wherein,
the end portions include a substantially rearward facing rectangular shaped end portion surface extending to a far edge to approximately align with the rear fender and extend beyond the tail-gate edge and the utility well is positioned in the substantially rearward facing rectangular shaped end portion surface and the opening perimeter edge extends beyond the tail-gate edge.

5. The rear bumper for a vehicle in claim 1 wherein,
the vehicle has a truck bed back edge oriented substantially perpendicularly to the at least one rear fender and the end portion rearward facing surface extends angularly forward at an angle of between about 10 degrees and 30 degrees relative to the back edge of the truck bed and toward the at least one rear fender.

6. The rear bumper for a vehicle in claim 5 wherein,
the vehicle has a truck bed bottom surface and the end portion rearward facing surface angles downward at an angle of between about 10 degrees and 45 degrees relative to a normal extending from the truck bed bottom surface.

7. The rear bumper for a vehicle in claim 1 wherein,
the utility well has an access panel hingedly attached along a portion of the opening perimeter edge that can be opened or closed to allow or restrict access to the utility well.

8. The rear bumper for a vehicle in claim 7 wherein,
the truck bed has a truck bed bottom surface and the end portion rearward facing surface is substantially rectangular and angles downward at an angle of between about 10 degrees and 45 degrees relative to a normal extending from the truck bed bottom surface, and the utility well access panel is hingedly attached along a narrow segment of the end portion rearward facing surface that is closest to the middle portion.

9. The rear bumper for a vehicle in claim 1 wherein,
the utility well includes a utility well wall that extends in the forward direction relative to the vehicle and substantially parallel and adjacent to the vehicle rear fender.

10. The rear bumper for a vehicle in claim 9 wherein,
the end portion further includes an end portion downward facing surface that extends substantially parallel to the utility well wall.

11. A rear bumper for a truck, the truck having a truck bed bottom surface, a rear fender, a tail-gate with a tail-gate side edge, the rear bumper comprising:
a middle portion comprised of a pair of polygon shaped middle portion higher step surfaces on either lateral side of a upward facing polygon shaped middle portion lower step surface;
a pair of lateral portions, each lateral portion including a lateral portion rearward facing surface and a lateral portion step surface that transitions laterally from one of the polygon shaped middle portion higher step surfaces, the bumper lateral portions further comprising a lateral portion rearward facing surface angled forward relative to the tail-gate at an angle of between about 10 degrees and 30 degrees; and
a utility well having a utility well opening perimeter edge cut into at least one of the lateral portion rearward facing surfaces with an access panel hingedly attached along a portion of the utility well opening perimeter edge.

12. The rear bumper in claim 11 wherein,
the at least one lateral portion rearward facing surface comprises a substantially rectangular shaped surface.

13. The rear bumper in claim 11 wherein,
the at least one lateral portion rearward facing surface is angled forward at an angle of between about 10 degrees and 30 degrees relative to the back edge of the tail-gate.

14. The rear bumper for a vehicle in claim 13 wherein,
the lateral portion rearward facing surface also angles downward at an angle of between about 10 degrees and 45 degrees relative to a normal extending from the truck bed bottom surface.

* * * * *